(12) United States Patent
Hu et al.

(10) Patent No.: US 12,549,446 B2
(45) Date of Patent: Feb. 10, 2026

(54) MAPPING RELATIONSHIP GENERATION METHOD AND APPARATUS, AND STORAGE MEDIUM

(71) Applicant: Shenzhen Yinwang Intelligent Technologies Co., Ltd., Shenzhen (CN)

(72) Inventors: Yong Hu, Dongguan (CN); Jun Ye, Dongguan (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/641,758

(22) Filed: Apr. 22, 2024

(65) Prior Publication Data
US 2024/0275688 A1    Aug. 15, 2024

Related U.S. Application Data

(63) Continuation of application No. PCT/CN2021/125308, filed on Oct. 21, 2021.

(51) Int. Cl.
*H04L 41/12* (2022.01)
*H04L 41/50* (2022.01)
*G06F 9/44* (2018.01)

(52) U.S. Cl.
CPC .............. *H04L 41/12* (2013.01); *H04L 41/50* (2013.01); *G06F 9/44* (2013.01)

(58) Field of Classification Search
CPC ............ H04L 41/12; H04L 41/50; G06F 9/44
See application file for complete search history.

(56) References Cited

U.S. PATENT DOCUMENTS

| | | | |
|---|---|---|---|
| 8,234,351 B2 | 7/2012 | Curran et al. | |
| 2015/0331979 A1* | 11/2015 | Englehart | G06F 30/20 |
| | | | 703/2 |
| 2016/0308822 A1* | 10/2016 | Chae | H04W 4/48 |
| 2020/0294401 A1* | 9/2020 | Kerecsen | G08G 1/205 |
| 2023/0367833 A1* | 11/2023 | Kol | H04L 63/0876 |

FOREIGN PATENT DOCUMENTS

| | | |
|---|---|---|
| WO | 2020070061 A1 | 4/2020 |
| WO | 2021107179 A1 | 6/2021 |

OTHER PUBLICATIONS

AUTOSAR AP R19-11, "Specification of Manifest", AUTOSAR, Nov. 28, 2019, 826 pages.

* cited by examiner

*Primary Examiner* — Benjamin M Thieu
(74) *Attorney, Agent, or Firm* — Conley Rose, P.C.

(57) ABSTRACT

A mapping relationship generation method includes: obtaining information about a mapping relationship between a communication connector on a node and a network domain; obtaining information about a mapping relationship between a process and the node, where the information about the mapping relationship between the process and the node includes a software component corresponding to the process, and the software component includes at least one port prototype; creating, based on the information about the mapping relationship between the communication connector on the node and the network domain and the information about the mapping relationship between the process and the node, a service instance for the port prototype used by the process in the network domain; and creating a mapping relationship between the service instance and a target communication connector on the node.

20 Claims, 6 Drawing Sheets

MAPPING RELATIONSHIP GENERATION METHOD AND APPARATUS, AND STORAGE MEDIUM

CROSS-REFERENCE TO RELATED APPLICATIONS

This is a continuation of International Patent Application No. PCT/CN2021/125308 filed on Oct. 21, 2021, which is hereby incorporated by reference in its entirety.

TECHNICAL FIELD

This disclosure relates to the field of intelligent vehicles, and in particular, to a mapping relationship generation method and apparatus, and a storage medium.

BACKGROUND

An AUTomotive Open System ARchitecture (AUTOSAR) is an open and de facto standardized software architecture developed to reduce development risks of automotive software. With gradual application of intelligent vehicles, a vehicle that integrates a plurality of auxiliary functions such as sensing, planning and control, and automatic cruise is a typical high-tech complex. Therefore, the vehicle is increasingly intelligent and electronic, and a software structure of the vehicle is increasingly complex. An adaptive platform is developed in the AUTOSAR based on an original classic platform.

Communication management (CM) is a top priority of the AUTOSAR adaptive platform. In a process of configuring CM, a series of mapping relationships usually need to be established for a communication service after the communication service is instantiated. A common case is to establish a mapping relationship manually for each instance one by one. This is complex and inefficient.

SUMMARY

In view of this, a mapping relationship generation method and apparatus, and a storage medium are proposed.

According to a first aspect, an embodiment of this disclosure provides a mapping relationship generation method. The method includes obtaining information about a mapping relationship between a communication connector on a node and a network domain, obtaining information about a mapping relationship between a process and the node, where the information about the mapping relationship between the process and the node includes a software component corresponding to the process, and the software component includes at least one port prototype, and creating, based on the information about the mapping relationship between the communication connector on the node and the network domain and the information about the mapping relationship between the process and the node, a service instance for the port prototype used by the process in the network domain, and creating a mapping relationship between the service instance and a target communication connector on the node.

According to this embodiment of this disclosure, the service instance is created for the port prototype used by the process in the network domain, to create the mapping relationship between the service instance and the target communication connector on the node. In this way, in a process of configuring CM, the mapping relationship can be established between the service instance created in the network domain and the target communication connector without a manual operation, so that a corresponding node can communicate with the service instance, and the mapping relationship does not need to be manually established. This simplifies a configuration procedure and improves configuration efficiency.

According to the first aspect, in a first possible implementation of the mapping relationship generation method, the method further includes creating the network domain, and configuring the information about the mapping relationship between the communication connector on the node and the network domain.

In this way, a connection between the communication connector on the node and the network domain can be established, so that the mapping relationship between the service instance in the network domain and the target communication connector can be automatically created subsequently.

According to the first aspect or the first possible implementation of the first aspect, in a second possible implementation of the mapping relationship generation method, the method further includes configuring the mapping relationship between the process and the node, and allocating the corresponding software component to the process.

In this way, an association relationship between the process and the software component can be determined, so that the mapping relationship between the service instance in the network domain and the target communication connector can be automatically created subsequently.

According to the first aspect or the first or second possible implementation of the first aspect, in a third possible implementation of the mapping relationship generation method, the method further includes configuring the port prototype used by the process to communicate with another process in the network domain.

In this way, an association relationship between the process and the port prototype can be determined, so that the mapping relationship between the service instance in the network domain and the target communication connector can be automatically created subsequently.

According to the first, second, or third possible implementation of the first aspect, in a fourth possible implementation of the mapping relationship generation method, creating the network domain, and configuring the information about the mapping relationship between the communication connector on the node and the network domain includes determining an identifier (ID) of the network domain, creating, based on the information about the mapping relationship between the communication connector on the node and the network domain and the information about the mapping relationship between the process and the node, a service instance for the port prototype used by the process in the network domain, and creating a mapping relationship between the service instance and a target communication connector on the node includes, when a communication protocol of the service instance is a data distribution service (DDS), determining that a network domain ID associated with the service instance is the ID.

According to this embodiment of this disclosure, the ID of the network domain is determined, so that when the communication protocol is the DDS, the service instance can be associated with the network domain ID without a need of manual setting. This simplifies a configuration process and improves configuration efficiency.

According to the first aspect or the first, second, third, or fourth possible implementation of the first aspect, in a fifth possible implementation of the mapping relationship generation method, each communication connector is associated with an Internet Protocol (IP) address.

In this way, the node can communicate with another configured object through the communication connector.

According to the first aspect or the first, second, third, fourth, or fifth possible implementation of the first aspect, in a sixth possible implementation of the mapping relationship generation method, creating, based on the information about the mapping relationship between the communication connector on the node and the network domain and the information about the mapping relationship between the process and the node, a service instance for the port prototype used by the process in the network domain, and creating a mapping relationship between the service instance and a target communication connector on the node includes determining, based on the information about the mapping relationship between the communication connector on the node and the network domain, a first communication connector information set corresponding to the network domain, where the first communication connector information set includes at least one communication connector on the node, determining, based on information about a mapping relationship between the service instance and the port prototype of the software component, a second communication connector information set corresponding to the port prototype of the software component, where the second communication connector information set includes at least one communication connector on a target node, and determining the mapping relationship between the service instance and the target communication connector based on the first communication connector information set and the second communication connector information set.

According to this embodiment of this disclosure, two communication connector information sets are determined, to determine the target communication connector, and the target communication connector does not need to be manually searched for, so that the mapping relationship between the service instance and the target communication connector can be established in a configuration process, and the mapping relationship does not need to be manually established, to implement mapping from the service instance to the node. This simplifies the configuration procedure and improves efficiency.

According to the sixth possible implementation of the first aspect, in a seventh possible implementation of the mapping relationship generation method, creating the mapping relationship between the service instance and the target communication connector based on the first communication connector information set and the second communication connector information set includes determining the target communication connector based on an intersection set of the first communication connector information set and the second communication connector information set, and creating the mapping relationship between the service instance and the target communication connector.

In this way, the mapping relationship between the service instance and the target communication connector can be determined without a need of manually searching for the target communication connector corresponding to the service instance, to implement communication between the service instance and the target node. This simplifies the configuration procedure and improves efficiency.

According to the first aspect or the first, second, third, fourth, fifth, sixth, or seventh possible implementation of the first aspect, in an eighth possible implementation of the mapping relationship generation method, the method is used to configure a communication service in an AUTOSAR adaptive platform.

In this way, this method can be applied to a vehicle, so that configuration of CM can be more efficiently implemented on the AUTOSAR adaptive platform, to apply a corresponding communication service.

According to a second aspect, an embodiment of this disclosure provides a mapping relationship generation apparatus. The apparatus includes a first obtaining module configured to obtain information about a mapping relationship between a communication connector on a node and a network domain, a second obtaining module configured to obtain information about a mapping relationship between a process and the node, where the information about the mapping relationship between the process and the node includes a software component corresponding to the process, and the software component includes at least one port prototype, and a creating module configured to create, based on the information about the mapping relationship between the communication connector on the node and the network domain and the information about the mapping relationship between the process and the node, a service instance for the port prototype used by the process in the network domain, and create a mapping relationship between the service instance and a target communication connector on the node.

According to the second aspect, in a first possible implementation of the mapping relationship generation apparatus, the apparatus further includes a first configuration module configured to create the network domain, and configure the information about the mapping relationship between the communication connector on the node and the network domain.

According to the second aspect or the first possible implementation of the second aspect, in a second possible implementation of the mapping relationship generation apparatus, the apparatus further includes a second configuration module configured to configure the mapping relationship between the process and the node, and allocate the corresponding software component to the process.

According to the second aspect or the first or second possible implementation of the second aspect, in a third possible implementation of the mapping relationship generation apparatus, the apparatus further includes a third configuration module configured to configure the port prototype used by the process to communicate with another process in the network domain.

According to the first, second, or third possible implementation of the second aspect, in a fourth possible implementation of the mapping relationship generation apparatus, the first configuration module includes determining an ID of the network domain, and the creating module includes, when a communication protocol of the service instance is a DDS, determining that a network domain ID associated with the service instance is the ID.

According to the second aspect or the first, second, third, or fourth possible implementation of the second aspect, in a fifth possible implementation of the mapping relationship generation apparatus, each communication connector is associated with an IP address.

According to the second aspect or the first, second, third, fourth, or fifth possible implementation of the second aspect, in a sixth possible implementation of the mapping relationship generation apparatus, the creating module includes determining, based on the information about the mapping relationship between the communication connector on the node and the network domain, a first communication connector information set corresponding to the network domain, where the first communication connector information set includes at least one communication connector on the node, determining, based on information about a mapping relationship between the service instance and the port prototype of the software component, a second communication connector information set corresponding to the port prototype of the software component, where the second communication connector information set includes at least one communication connector on a target node, and creating the mapping relationship between the service instance and the target communication connector based on the first communication connector information set and the second communication connector information set.

According to the sixth possible implementation of the second aspect, in a seventh possible implementation of the mapping relationship generation apparatus, creating the mapping relationship between the service instance and the target communication connector based on the first communication connector information set and the second communication connector information set includes determining the target communication connector based on an intersection set of the first communication connector information set and the second communication connector information set, and creating the mapping relationship between the service instance and the target communication connector.

According to the second aspect or the first, second, third, fourth, fifth, sixth, or seventh possible implementation of the second aspect, in an eighth possible implementation of the mapping relationship generation apparatus, the apparatus is configured to configure a communication service in an AUTOSAR adaptive platform.

According to a third aspect, an embodiment of this disclosure provides a mapping relationship generation apparatus. The apparatus includes a processor, and a memory configured to store instructions executable by the processor. When the processor is configured to execute the instructions, the mapping relationship generation method according to the first aspect or one or more of the plurality of possible implementations of the first aspect is implemented.

According to a fourth aspect, an embodiment of this disclosure provides a non-volatile computer-readable storage medium. The non-volatile computer-readable storage medium stores computer program instructions. When the computer program instructions are executed by a processor, the mapping relationship generation method according to the first aspect or one or more of the plurality of possible implementations of the first aspect is implemented.

According to a fifth aspect, an embodiment of this disclosure provides a terminal device. The terminal device may perform the mapping relationship generation method according to the first aspect or one or more of the plurality of possible implementations of the first aspect.

According to a sixth aspect, an embodiment of this disclosure provides a computer program product. The computer program product includes computer-readable code or a non-volatile computer-readable storage medium carrying a computer-readable code. When the computer-readable code is run on an electronic device, a processor in the electronic device performs the mapping relationship generation method according to the first aspect or one or more of the possible implementations of the first aspect.

These aspects and other aspects of this disclosure will be more concise and more comprehensive in descriptions of the following (a plurality of) embodiments.

BRIEF DESCRIPTION OF DRAWINGS

Accompanying drawings included in this specification and constituting a part of this specification and this specification jointly show some example embodiments, features, and aspects of this disclosure, and are intended to explain some principles of this disclosure.

DESCRIPTION OF EMBODIMENTS

The following describes various example embodiments, features, and aspects of this disclosure in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

A specific term "example" herein means "used as an example, embodiment or illustration". Any embodiment described as "example" is not necessarily explained as being superior or better than other embodiments.

In addition, to better describe this disclosure, numerous specific details are given in the following specific implementations. A person skilled in the art should understand that this disclosure can also be implemented without some specific details. In some embodiments, methods, means, elements, and circuits that are well-known to a person skilled in the art are not described in detail, so that a subject matter of this disclosure is highlighted.

Figure 1:
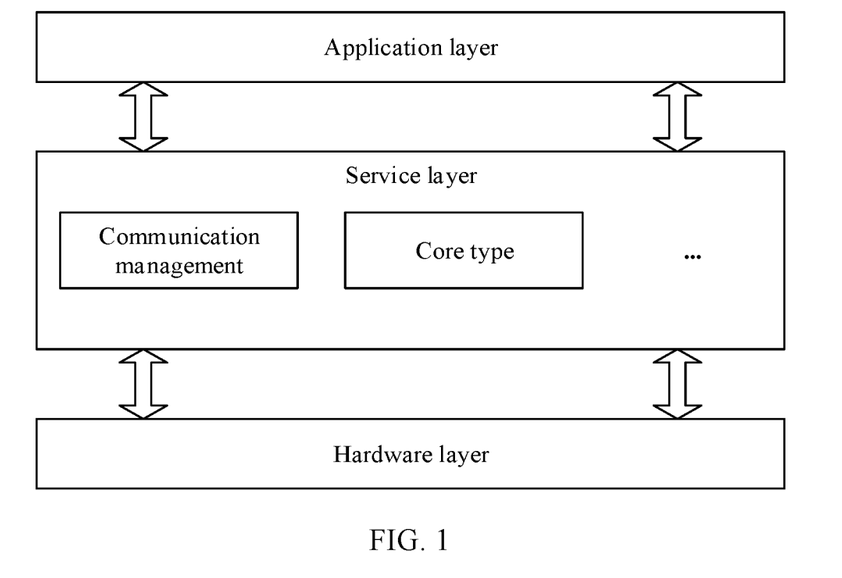
FIG. 1 is a schematic diagram of an application scenario according to an embodiment of this disclosure.

FIG. 1 is a schematic diagram of an application scenario according to an embodiment of this disclosure. A mapping relationship generation method in this disclosure may be used in a process of configuring CM on an AUTOSAR adaptive platform. As shown in FIG. 1, an architecture of the AUTOSAR adaptive platform may include an application layer, a service layer, and a hardware layer. The application layer may include software used to implement an application function, for example, a software component (SWC). The service layer may provide various background services for the application layer, such as CM and a core type used to provide a data structure definition service. The hardware layer may include each node, and the node may be a vehicle chip equipped in a vehicle, for example, a micro control unit (MCU), or may be a domain controller including an MCU, an in-vehicle infotainment, and the like.

In a process of configuring CM, a communication service is usually instantiated in CM. To be specific, after a service instance is determined, a series of mapping relationships are established for the communication service, to establish a mapping relationship between the service instance and a node (or a machine) at the hardware layer, so that the SWC at the application layer can apply the communication service corresponding to the service instance. In the process, if a mapping relationship is manually established for each service instance one by one, the process will be very complex.

In view of this, in the mapping relationship generation method in this disclosure, the service instance is created in a network domain, and a mapping relationship between the network domain and a communication connector on each node is determined (equivalent to establishing the mapping relationship between the service instance and the node), so that a series of mapping relationships can be established in the process of configuring CM. Finally, mapping between the service instance and a target communication connector can be implemented without a manual operation. This improves efficiency in the configuration process.

In the application scenario shown in FIG. 1, the following describes in detail the mapping relationship generation method in embodiments of this disclosure by using FIG. 2 to FIG. 7.

Figure 2:
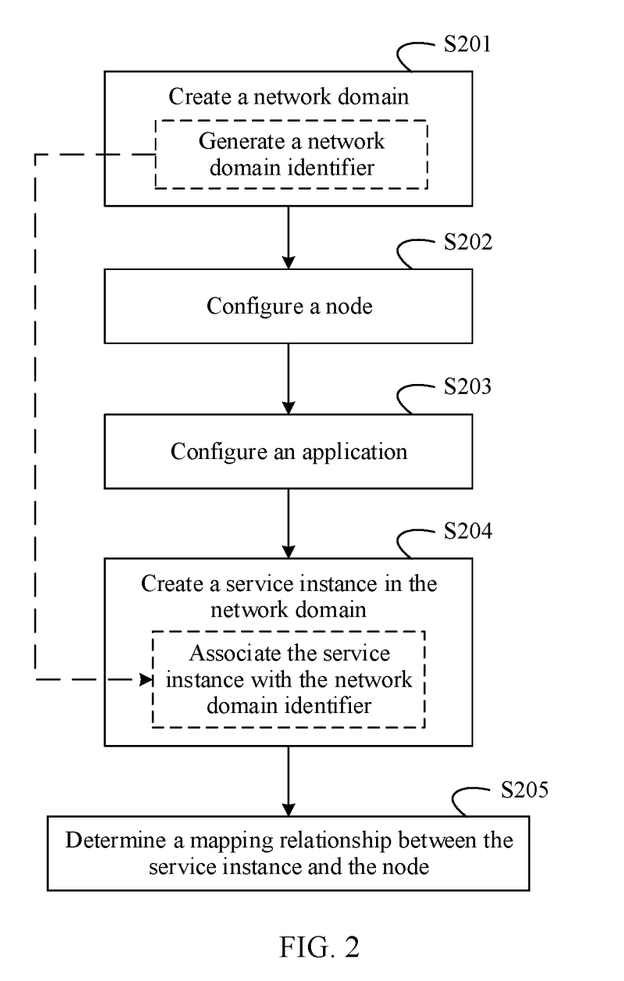
FIG. 2 is a flowchart of a mapping relationship generation method according to an embodiment of this disclosure.

FIG. 2 is a flowchart of a mapping relationship generation method according to an embodiment of this disclosure. As shown in FIG. 2, the method may be applied to a processor, and the method includes the following steps:

Step S201: Create the network domain.

Optionally, the network domain may be a virtual network domain.

When a communication protocol bound to a service interface deployment is a DDS, a default domain ID of a corresponding network domain may be generated for each created network domain.

Step S202: Configure the node.

A process of configuring the node may include configuring an Ethernet cluster. In this process, a network configuration, for example, an IP address or a subnet mask, of the Ethernet may be defined.

After the Ethernet cluster is configured, the process may further include configuring a node design (or machine design). In this process, an Ethernet communication connector (namely, the foregoing communication connector) on the node may be defined, to implement association between the node and the communication connector. Each communication connector on the node may allocate an IP address to the node, to implement communication between the node and another network domain, service instance, or the like. Corresponding different communication connectors may be defined for different communication protocols. A service discovery IP address may also be defined, so that an IP address of a corresponding service can be determined when the corresponding service is accessed.

When the node is configured, information about a configured node design may be referenced.

After the node is configured, the mapping relationship between the network domain and the communication connector on each node may be created. A mapping relationship may be established between the network domain and a plurality of nodes. In this process, for each node, a communication connector on the node may be selected to establish a mapping relationship with the network domain.

Step S203: Configure an application.

A process of configuring the application may include configuring a software component type, for example, defining an object and attribute of the software component. A receive port prototype (for example, an R-port prototype) for requesting a service or data on the software component may also be defined, and a send port prototype (for example, a P-port prototype) for providing a service or data may also be defined.

After the software component type is configured, the process may further include configuring an executable program. When the executable program is configured, related information of the configured software component type may be referenced, to implement association between the executable program and the SWC.

After the executable program is configured, the process may further include configuring a process design. When the process design is configured, related information of a configured executable program may be referenced.

After the process design is configured, the process may further include configuring a process. When the process is configured, the related information of the configured executable program and related information of the process design may be referenced, to implement association between the process and the executable program.

In this way, an association relationship among the software component (including a port prototype on the software component), the executable program, and the process can be implemented.

After the application is configured, a mapping relationship between the process and the node may be established, and a mapping relationship between the process and the software component is obtained based on the association relationship among the software component, the executable program, and the process, to allocate a corresponding software component to the process.

Step S204: Create the service instance in the network domain.

The network domain may be the network domain created in step S201.

In a possible implementation, in a process of creating the service instance, after the application is configured, a corresponding service instance may be created for the port prototype of the software component (for example, a service instance is separately created for the P-port prototype and the R-port prototype), to establish a mapping relationship between the port prototype of the software component and the service instance. Then, the service instance may be associated with the configured node based on the mapping relationship between the process and the node.

In the process of creating the service instance, related information of a configured service interface deployment may be referenced.

Figure 3:
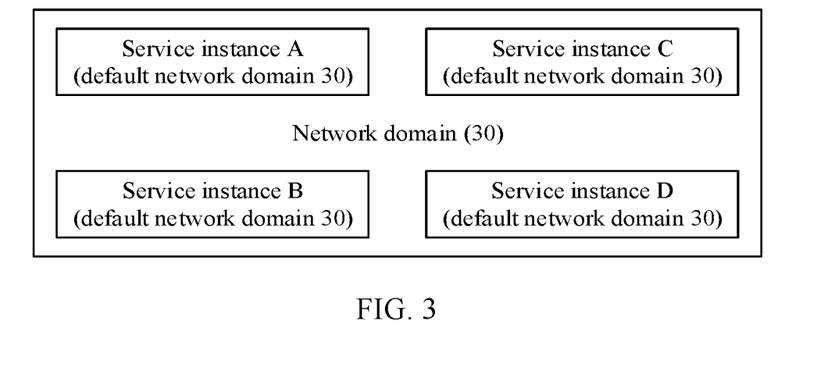
FIG. 3 is a schematic diagram of creating a service instance in a network domain according to an embodiment of this disclosure.

If the bound communication protocol is the DDS, a network domain identifier and the service instance can be automatically associated without a need of manually setting, so that repeated configuration is avoided. FIG. 3 is a schematic diagram of creating a service instance in a network domain according to an embodiment of this disclosure. As shown in FIG. 3, for a network domain created in step S201, a network domain identifier, for example, 30 (the network domain identifier may be modified) may be defaulted. A plurality of service instances, for example, a service instance A, a service instance B, a service instance C, and a service instance D in the figure may be created in the network domain. If the bound communication protocol is the DDS, an attribute of a network domain ID of each service instance that may be created in the network domain may be set to a default network domain identifier of the network domain, and manual repeated configuration is not required. For example, attributes of network domain identifiers in the service instance A, the service instance B, the service instance C, and the service instance D in a same network domain may be set to 30. In this way, an attribute of the corresponding network domain identifier in the service instance can be configured. When the service instance is created in the network domain, some other attributes of the service instance may also be automatically configured. This is not limited in this disclosure.

Step S205: Determine the mapping relationship between the service instance and the node.

Determining the mapping relationship between the service instance and the node is actually implementing communication between the node and the service instance, and therefore is actually determining the mapping relationship between the service instance and the target communication connector on the node. The mapping relationship between the service instance and the target communication connector may be implemented in the following one implementation.

Figure 4:
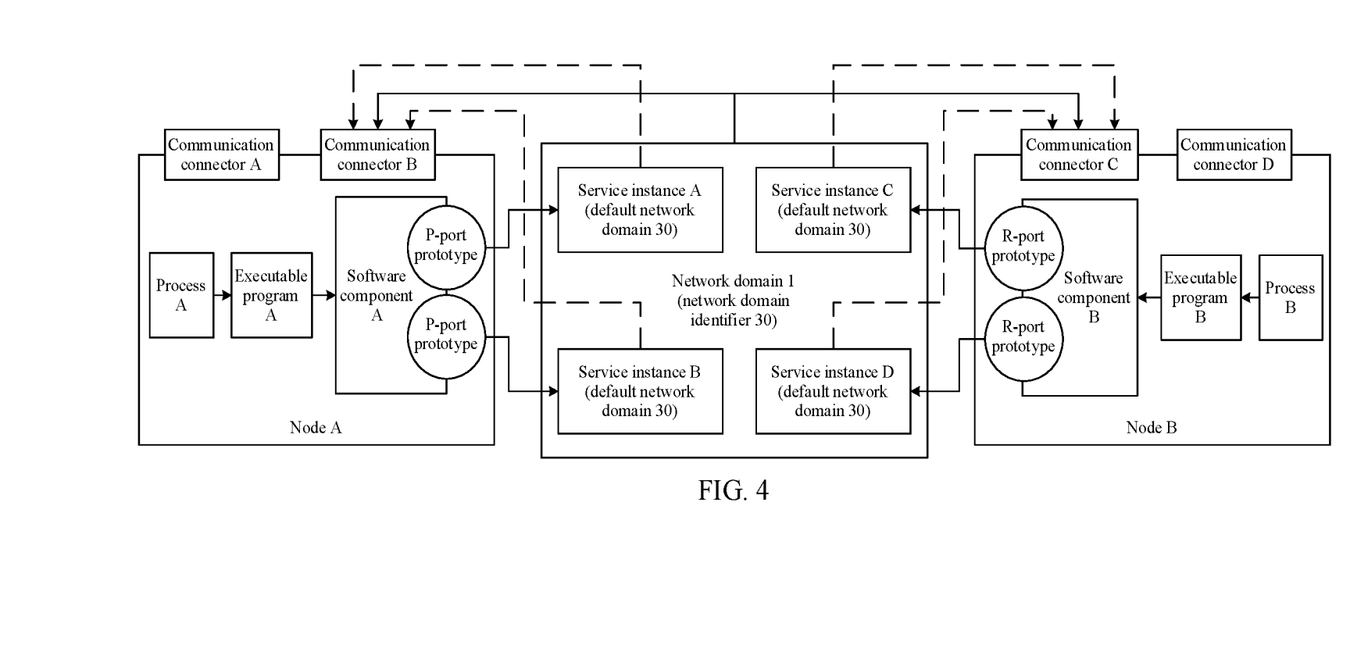
FIG. 4 is a schematic diagram of determining a mapping relationship according to an embodiment of this disclosure.

FIG. 4 is a schematic diagram of determining a mapping relationship according to an embodiment of this disclosure. As shown in FIG. 4, a solid line connection arrow in the figure may indicate that a mapping relationship is established between two parties in a connection. For example, a connection arrow between a network domain 1 and a communication connector B may indicate a mapping relationship between a network domain 1 and a communication connector on a node A, and a connection arrow between the network domain 1 and a communication connector C may indicate a mapping relationship between the network domain 1 and a communication connector on a node B. In this way, based on the mapping relationship between the network domain 1 and each of the communication connector on the node A and the communication connector the node B, a set list A of the communication connectors may be obtained. The set includes the communication connector B and the communication connector C, which respectively correspond to the communication connector on the node A and the communication connector on the node B that are configured to connect to the network domain 1.

In FIG. 4, a P-port prototype and an R-port prototype may respectively correspond to the port prototype P-port prototype and the R-port prototype of the software component, and a connection arrow between the service instance and the P-port prototype and a connection arrow between the service instance and the R-port prototype may indicate a mapping relationship between the determined service instance and the port prototype of the software component. In step S203, the association relationship among the software component, the executable program, and the process is determined, and the association relationship among the three (the software component, the executable program, and the process) and the node may be implemented by obtaining the mapping relationship between the process and the node. In this way, an association relationship between the service instance A and a software component corresponding to a P-port prototype of a software component A may be obtained by using the mapping relationship between the service instance (for example, the service instance A) and the port prototype of the software component, so that an association relationship between the service instance A and the executable program A, and an association relationship among the service instance A, the executable program A, and a process A can be obtained, and a node A associated with the service instance is finally determined. Because there is at least one communication connector on the node A, another set list B can be obtained. The set includes two communication connectors on the node A associated with the service instance A: a communication connector A and the communication connector B.

An intersection set of the list A and the list B may be used to determine a unique communication connector as the target communication connector, namely, the communication connector B. Therefore, a mapping relationship between the service instance A and the communication connector B can be determined. Refer to a dashed line connection arrow between the service instance A and the communication connector B in FIG. 4. Similarly, for other service instances B, C, and D, refer to corresponding dashed line connection arrows in FIG. 4.

In this way, a corresponding target communication connector can be found, and a mapping relationship between the service instance and the target communication connector is established, to complete the process of configuring CM. In this process, a user does not need to manually search, compare, and configure, so that efficiency of the configuration process is improved.

Optionally, the processes in step S201 to step S205 may be performed on a visual interface, for example, displayed in a manner of a graph, a table, or the like. The user may perform an operation on the visual interface, to modify configured content. A graph shown in FIG. 4 is used as an example. There is no existing connection arrow in an initial graph in FIG. 4. The user may establish a connection arrow in the initial graph, to determine a mapping relationship of two that corresponds to each other. For the connection arrow established by the user, refer to the solid line connection arrow (for example, an arrow from the P-port prototype to the service instance A) in FIG. 4. After the user establishes a mapping relationship corresponding to the solid line connection arrow shown in FIG. 4, the mapping relationship between the service instance and a corresponding target communication connector may be determined according to the foregoing method (as the dashed line connection arrow shown in FIG. 4, and in this step, no user connection is needed).

Optionally, after CM is configured, a CM configuration result may be presented in a visual manner like a text, an image, or a video. For example, an attribute of an object (like a service instance or a node) configured during configuration, an established mapping relationship, and the like may be displayed in a domain view (or division of domain CM channel view). In the view, the object and the attribute thereof may be displayed, and a connection line between objects may indicate the established mapping relationship during configuration.

It should be noted that, in a possible implementation, basic data type definition, service interface configuration, and service interface deployment configuration may be completed before step S201.

A process of defining a basic data type may be implemented by using a service in a core type. The data type is, for example, an integer (int) type or a floating point (float) type.

In a process of configuring a service interface, a communication manner required by a service may be defined. For each communication manner, for example, an event, a method, and a field are defined in the communication manner. A data type (for example, corresponding to the basic data type) required by each communication manner may be further determined.

In a process of configuring a service interface deployment, related information of a configured service interface may be referenced, and the service interface deployment may be further bound to a corresponding communication protocol. In addition to the DDS, the bound communication protocol may alternatively be a communication protocol like a Scalable service-Oriented Middleware (SOME) over IP (SOME/IP).

It should be noted that an execution sequence of the steps shown in FIG. 2 is not unique, and the solutions in embodiments of this disclosure may alternatively be performed in a sequence different from that marked in FIG. 2. For example, an execution sequence of step S205 and step S204 may be exchanged.

Figure 5:
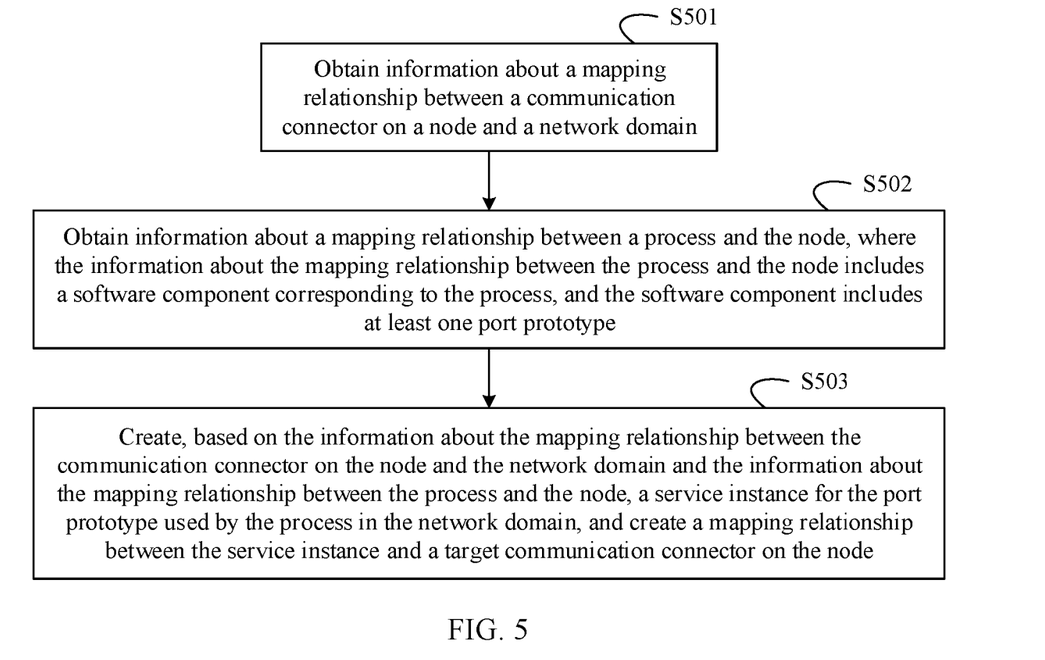
FIG. 5 is a flowchart of a mapping relationship generation method according to an embodiment of this disclosure.

FIG. 5 is a flowchart of a mapping relationship generation method according to an embodiment of this disclosure. The method may be applied to a processor. As shown in FIG. 5, the method includes the following steps.

S501: Obtain information about a mapping relationship between the communication connector on the node and the network domain.

Step S502: Obtain information about a mapping relationship between a process and the node, where the information about the mapping relationship between the process and the node includes a software component corresponding to the process, and the software component includes at least one port prototype.

Step S503: Create, based on the information about the mapping relationship between the communication connector on the node and the network domain and the information about the mapping relationship between the process and the node, a service instance for the port prototype used by the process in the network domain, and create a mapping relationship between the service instance and a target communication connector on the node.

According to this embodiment of this disclosure, the service instance is created for the port prototype used by the process in the network domain, to create the mapping relationship between the service instance and the target communication connector on the node. In this way, in the process of configuring the CM, the mapping relationship can be established between the service instance created in the network domain and the target communication connector without a manual operation, so that a corresponding node can communicate with the service instance, and the mapping relationship does not need to be manually established. This simplifies a configuration procedure and improves configuration efficiency.

The network domain may be a virtual domain. The at least one port prototype may be a plurality of groups of port prototypes, and each group of port prototypes may include a receive port prototype and a send port prototype.

For a related example of creating the service instance for the port prototype used by the process in the network domain in step S503, refer to related descriptions in step S204 in FIG. 2. It should be noted that creating the service instance for the port prototype used by the process in the network domain may alternatively be associating a service instance with a corresponding port prototype after the service instance is created. For examples of step S501 to step S503, refer to related descriptions in step S205 in FIG. 2.

In a possible implementation, the method is used to configure a communication service in an AUTOSAR adaptive platform.

In this way, this method can be applied to a vehicle, so that configuration of CM can be more efficiently implemented on the AUTOSAR adaptive platform, to apply a corresponding communication service.

For an architecture of the AUTOSAR adaptive platform, refer to FIG. 1.

In a possible implementation, the method further includes creating the network domain, and configuring the information about the mapping relationship between the communication connector on the node and the network domain.

In this way, a connection between the communication connector on the node and the network domain can be established, so that the mapping relationship between the service instance in the network domain and the target communication connector can be automatically created subsequently.

For the process, refer to related descriptions in step S201 in FIG. 2.

In a possible implementation, the method further includes configuring the mapping relationship between the process and the node, and allocating the corresponding software component to the process.

In this way, an association relationship between the process and the software component can be determined, so that the mapping relationship between the service instance in the network domain and the target communication connector can be automatically created subsequently.

For the process, refer to related descriptions in step S203 in FIG. 2.

In a possible implementation, the method further includes configuring a port prototype used by the process to communicate with another process in the network domain.

In this way, an association relationship between the process and the port prototype can be determined, so that the mapping relationship between the service instance in the network domain and the target communication connector can be automatically created subsequently.

For the process, refer to related descriptions in step S203 in FIG. 2.

In a possible implementation, creating the network domain, and configuring the information about the mapping relationship between the communication connector on the node and the network domain includes determining an ID of the network domain, creating, based on the information about the mapping relationship between the communication connector on the node and the network domain and the information about the mapping relationship between the process and the node, the service instance for the port prototype used by the process in the network domain, and creating the mapping relationship between the service instance and the target communication connector on the node includes, when a communication protocol of the service instance is a DDS, determining that a network domain ID associated with the service instance is the ID.

According to this embodiment of this disclosure, the ID of the network domain is determined, so that when the communication protocol is the DDS, the service instance can be associated with the network domain ID without a need of manual setting. This simplifies a configuration process and improves configuration efficiency.

The ID of the network domain may be the network domain identifier, and the ID may be modified as required.

For a related example of creating the network domain, refer to related descriptions in step S201 in FIG. 2. For a related example of determining the network domain ID associated with the service instance, refer to related descriptions in step S204.

In a possible implementation, each communication connector is associated with an IP address.

In this way, the node can communicate with another configured object through the communication connector.

Figure 6:
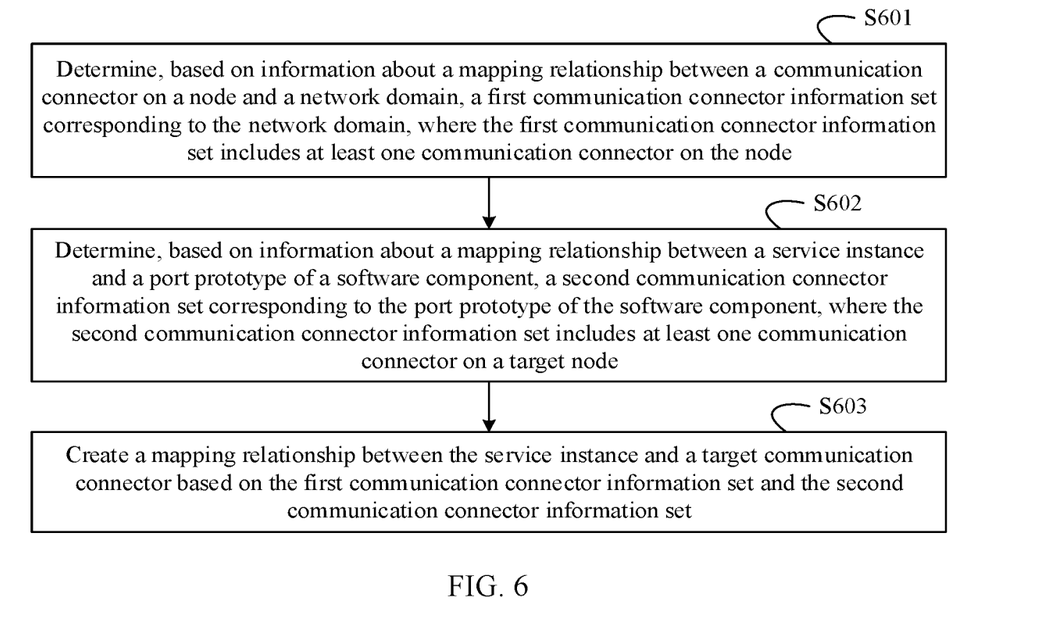
FIG. 6 is a flowchart of a mapping relationship generation method according to an embodiment of this disclosure.

FIG. 6 is a flowchart of a mapping relationship generation method according to an embodiment of this disclosure. As shown in FIG. 6, creating, based on information about a mapping relationship between the communication connector on the node and the network domain and information about a mapping relationship between a process and the node, a service instance for a port prototype used by the process in the network domain, and creating a mapping relationship between the service instance and a target communication connector on the node, includes the following steps:

Step S601: Determine, based on the information about the mapping relationship between the communication connector on the node and the network domain, a first communication connector information set corresponding to the network domain, where the first communication connector information set includes at least one communication connector on the node.

Step S602: Determine, based on information about a mapping relationship between the service instance and the port prototype of the software component, a second communication connector information set corresponding to the port prototype of the software component, where the second communication connector information set includes at least one communication connector on a target node.

Step S603: Create the mapping relationship between the service instance and the target communication connector based on the first communication connector information set and the second communication connector information set.

According to this embodiment of this disclosure, two communication connector information sets are determined, to determine the target communication connector, and the target communication connector does not need to be manually searched for, so that the mapping relationship between the service instance and the target communication connector can be established in a configuration process, and the mapping relationship does not need to be manually established, to implement mapping from the service instance to the node. This simplifies a configuration procedure and improves efficiency.

For examples of step S601 to step S603, refer to related descriptions in step S205 in FIG. 2. The first communication connector information set may be, for example, the foregoing list A, and the second communication connector information set may be, for example, the foregoing list B.

Figure 7:
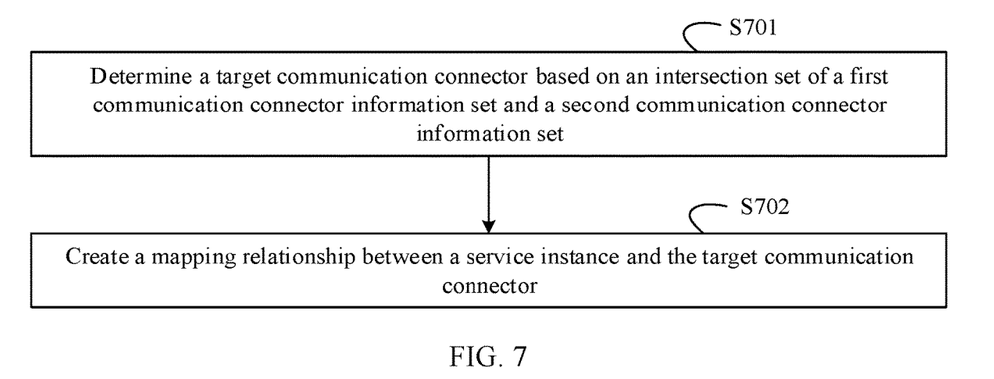
FIG. 7 is a flowchart of a mapping relationship generation method according to an embodiment of this disclosure.

FIG. 7 is a flowchart of a mapping relationship generation method according to an embodiment of this disclosure. As shown in FIG. 7, creating a mapping relationship between the service instance and a target communication connector based on a first communication connector information set and a second communication connector information set includes the following steps:

Step S701: Determine the target communication connector based on an intersection set of the first communication connector information set and the second communication connector information set.

Step S702: Create the mapping relationship between the service instance and the target communication connector.

In this way, the mapping relationship between the service instance and the target communication connector can be determined without a need of manually searching for the target communication connector corresponding to the service instance, to implement communication between the service instance and the target node. This simplifies a configuration procedure and improves efficiency.

For related examples of step S701 and step S702, refer to related descriptions in step S205 in FIG. 2. An intersection set of the first communication connector information set and the second communication connector information set is, for example, an intersection set of the foregoing list A and list B.

Figure 8:
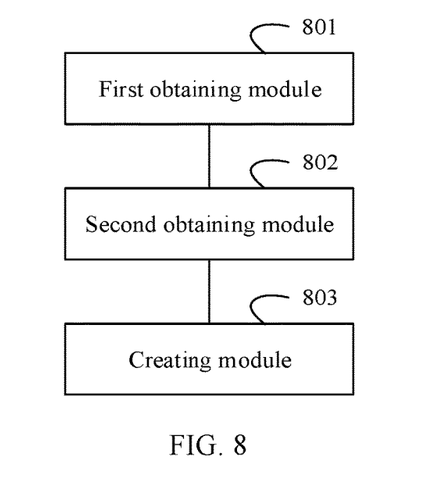
FIG. 8 is a diagram of a structure of a mapping relationship generation apparatus according to an embodiment of this disclosure.

FIG. 8 is a diagram of a structure of a mapping relationship generation apparatus according to an embodiment of this disclosure. As shown in FIG. 8, the apparatus includes a first obtaining module 801 configured to obtain information about a mapping relationship between a communication connector on a node and a network domain, a second obtaining module 802 configured to obtain information about a mapping relationship between a process and the node, where the information about the mapping relationship between the process and the node includes a software component corresponding to the process, and the software component includes at least one port prototype, and a creating module 803 configured to create, based on the information about the mapping relationship between the communication connector on the node and the network domain and the information about the mapping relationship between the process and the node, a service instance for the port prototype used by the process in the network domain, and create a mapping relationship between the service instance and a target communication connector on the node.

According to this embodiment of this disclosure, the service instance is created for the port prototype used by the process in the network domain, to create the mapping relationship between the service instance and the target communication connector on the node. In this way, in the process of configuring the CM, the mapping relationship can be established between the service instance created in the network domain and the target communication connector without a manual operation, so that a corresponding node can communicate with the service instance, and the mapping relationship does not need to be manually established. This simplifies a configuration procedure and improves configuration efficiency.

In a possible implementation, the apparatus is configured to configure a communication service in an AUTOSAR adaptive platform.

Therefore, this apparatus can be applied to a vehicle, so that configuration of CM can be more efficiently implemented on the AUTOSAR adaptive platform, to apply a corresponding communication service.

In a possible implementation, the apparatus further includes a first configuration module configured to create the network domain, and configure the information about the mapping relationship between the communication connector on the node and the network domain.

In this way, a connection between the communication connector on the node and the network domain can be established, so that the mapping relationship between the service instance in the network domain and the target communication connector can be automatically created subsequently.

In a possible implementation, the apparatus further includes a second configuration module configured to configure the mapping relationship between the process and the node, and allocate the corresponding software component to the process.

In this way, an association relationship between the process and the software component can be determined, so that the mapping relationship between the service instance in the network domain and the target communication connector can be automatically created subsequently.

In a possible implementation, the apparatus further includes a third configuration module configured to configure the port prototype used by the process to communicate with another process in the network domain.

In this way, an association relationship between the process and the port prototype can be determined, so that the mapping relationship between the service instance in the network domain and the target communication connector can be automatically created subsequently.

In a possible implementation, the first configuration module includes determining an ID of the network domain, and the creating module 803 includes, when a communication protocol of the service instance is a DDS, determining that a network domain ID associated with the service instance is the ID.

According to this embodiment of this disclosure, the ID of the network domain is determined, so that when the communication protocol is the DDS, the service instance can be associated with the network domain ID without a need of manual setting. This simplifies a configuration process and improves configuration efficiency.

In a possible implementation, each communication connector is associated with an IP address.

In this way, the node can communicate with another configured object through the communication connector.

In a possible implementation, the creating module 803 includes determining, based on the information about the mapping relationship between the communication connector on the node and the network domain, a first communication connector information set corresponding to the network domain, where the first communication connector information set includes at least one communication connector on the node, determining, based on information about a mapping relationship between the service instance and the port prototype of the software component, a second communication connector information set corresponding to the port prototype of the software component, where the second communication connector information set includes at least one communication connector on a target node, and creating the mapping relationship between the service instance and the target communication connector based on the first communication connector information set and the second communication connector information set.

According to this embodiment of this disclosure, two communication connector information sets are determined, to determine the target communication connector, and the target communication connector does not need to be manually searched for, so that the mapping relationship between the service instance and the target communication connector can be established in a configuration process, and the mapping relationship does not need to be manually established, to implement mapping from the service instance to the node. This simplifies a configuration procedure and improves efficiency.

In a possible implementation, creating the mapping relationship between the service instance and the target communication connector based on the first communication connector information set and the second communication connector information set includes determining the target communication connector based on an intersection set of the first communication connector information set and the second communication connector information set, and creating the mapping relationship between the service instance and the target communication connector.

In this way, the mapping relationship between the service instance and the target communication connector can be determined without a need of manually searching for the target communication connector corresponding to the service instance, to implement communication between the service instance and the target node. This simplifies a configuration procedure and improves efficiency.

Figure 9:
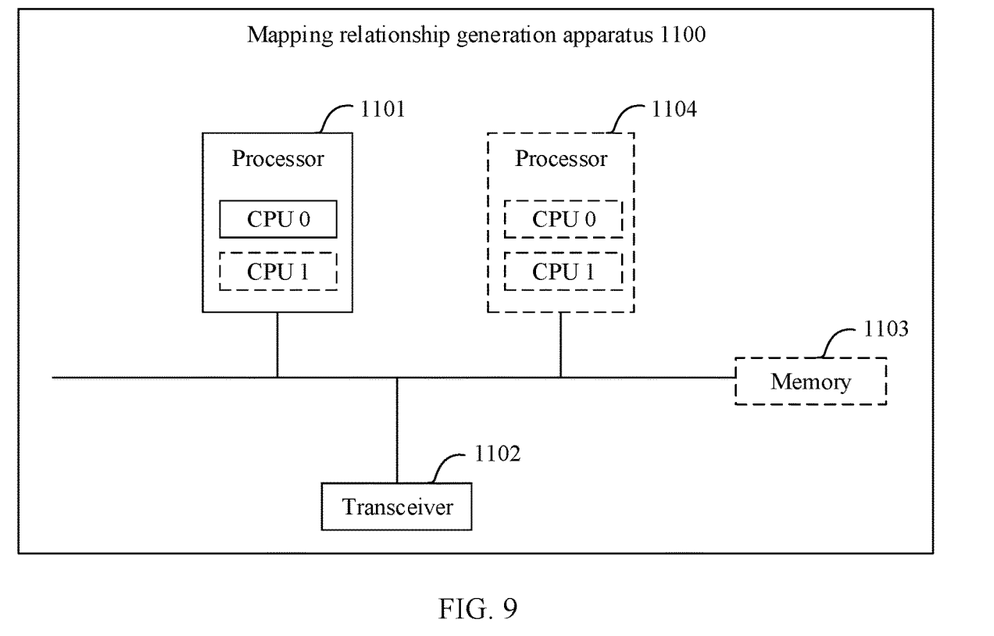
FIG. 9 is a diagram of a structure of a mapping relationship generation apparatus according to an embodiment of this disclosure.

FIG. 9 is a diagram of a structure of a mapping relationship generation apparatus according to an embodiment of this disclosure. The mapping relationship generation apparatus 1100 may be configured to perform the mapping relationship generation method shown in any one of FIG. 2 to FIG. 7. For example, the mapping relationship generation apparatus may be a server, or may be a chip (system) or another part or component that may be disposed inside the server. This is not limited in embodiments of this disclosure.

As shown in FIG. 9, the mapping relationship generation apparatus 1100 may include a processor 1101 and a transceiver 1102. Optionally, the mapping relationship generation apparatus 1100 may include a memory 1103. The processor 1101 is coupled to the transceiver 1102 and the memory 1103, for example, may be connected through a communication bus.

The following describes each part of the mapping relationship generation apparatus 1100 in detail with reference to FIG. 9.

The processor 1101 is a control center of the mapping relationship generation apparatus 1100, and may be one processor, or may be a collective name of a plurality of processing elements. For example, the processor 1101 may be one or more central processing units (CPUs) or an application-specific integrated circuit (ASIC), or may be configured as one or more integrated circuits implementing embodiments of this disclosure, for example, one or more microprocessors (digital signal processors (DSPs)) or one or more field-programmable gate arrays (FPGAs).

Optionally, the processor 1101 may run or execute a software program stored in the memory 1103 and invoke data stored in the memory 1103, to perform various functions of the mapping relationship generation apparatus 1100.

In a specific implementation, in an embodiment, the processor 1101 may include one or more CPUs, for example, a CPU 0 and a CPU 1 shown in FIG. 9.

In a possible implementation, the mapping relationship generation apparatus 1100 may also include a plurality of processors, for example, a processor 1101 and a processor 1104 shown in FIG. 9. Each of the processors may be a single-core processor (single-core CPU) or a multi-core processor (multi-core CPU). The processor herein may be one or more communication devices, circuits, and/or processing cores configured to process data (for example, computer program instructions).

The transceiver 1102 is configured to communicate with another server.

Optionally, the transceiver 1102 may include a receiver and a transmitter (not separately shown in FIG. 9). The receiver is configured to implement a receiving function, and the transmitter is configured to implement a sending function.

Optionally, the transceiver 1102 may be integrated with the processor 1101, or may exist independently, and is coupled to the processor 1101 through an input/output port (not shown in FIG. 9) of the mapping relationship generation apparatus 1100. This is not limited in embodiments of this disclosure.

The memory 1103 may be configured to store a software program for performing the solutions of this disclosure, and the processor 1101 controls execution of the software program. For a specific implementation, refer to the foregoing method embodiment, and details are not described herein again.

The memory 1103 may be a read-only memory (ROM) or another type of static storage communication device that can store static information and instructions, or a random-access memory (RAM) or another type of dynamic storage communication device that can store information and instructions, or may be an electrically erasable programmable ROM (EEPROM), a compact disc (CD) ROM (CD-ROM) or another CD storage, an optical disc storage (including a CD, a laser disc, an optical disc, a DIGITAL VERSATILE DISC (DVD), a BLU-RAY optical disc, or the like), a magnetic disk storage medium or another magnetic storage communication device, or any other medium that can be used to carry or store expected program code in a form of instruction or data structure and that can be accessed by a computer. However, the memory 1103 is not limited thereto. It should be noted that the memory 1103 may be integrated with the processor 1101, or may exist independently, and is coupled to the processor 1101 through an input/output port of the mapping relationship generation apparatus 1100. This is not limited in embodiments of this disclosure.

It should be noted that a structure of the mapping relationship generation apparatus 1100 shown in FIG. 9 does not constitute a limitation on an implementation of the mapping relationship generation apparatus. An actual mapping relationship generation apparatus may include more or fewer parts than those shown in the figure, or combine some parts, or have different part arrangements.

An embodiment of this disclosure provides a mapping relationship generation apparatus, including a processor and a memory configured to store instructions executable by the processor. When the processor is configured to execute the instructions, the method is implemented.

An embodiment of this disclosure provides a terminal device, and the terminal device may perform the foregoing methods.

An embodiment of this disclosure provides a non-volatile computer-readable storage medium, where the non-volatile computer-readable storage medium stores computer program instructions. When the computer program instructions are executed by a processor, the foregoing methods are implemented.

An embodiment of this disclosure provides a computer program product, including computer-readable code or a non-volatile computer-readable storage medium carrying a computer readable code. When the computer-readable code is run on a processor in an electronic device, the processor in the electronic device performs the foregoing methods.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include a portable computer disk, a hard disk, a RAM, a ROM, an erasable programmable ROM (EPROM or flash memory), a static RAM (SRAM), a portable CD-ROM, a DVD, a memory stick, a floppy disk, a mechanical coding device, for example, a punching card or a groove protrusion structure that stores instructions, and any suitable combination thereof.

The computer-readable program instructions or code described herein may be downloaded from the computer-readable storage medium to each computing/processing device, or downloaded to an external computer or an external storage device over a network, for example, the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this disclosure may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as SMALL-TALK and C++, and a conventional procedural programming language like "C" or a similar programming language. All computer-readable program instructions may be executed on a user computer, or some may be executed on a user computer as a standalone software package, or some may be executed on a local computer of a user while some is executed on a remote computer, or all the instructions may be executed on a remote computer or a server. When the remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, for example, a programmable logic circuit, an FPGA, or a programmable logic array (PLA), is customized by using status information of computer-readable program instructions. The electronic circuit may execute the computer-readable program instructions, to implement various aspects of this disclosure.

The various aspects of this disclosure are described herein with reference to the flowcharts and/or the block diagrams of the method, the apparatus (system), and the computer program product according to embodiments of this disclosure. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the other programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the other programmable data processing apparatus, or the other device to produce a computer-implemented process. Therefore, the instructions executed on the computer, the other programmable data processing apparatus, or the other device implements functions/actions specified in one or more blocks in the flowcharts and/or the block diagrams.

The flowcharts and the block diagrams in the accompanying drawings illustrate system architectures, functions, and operations of possible implementations of apparatuses, systems, methods, and computer program products according to a plurality of embodiments of this disclosure. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC) that performs a corresponding function or action, or may be implemented by a combination of hardware and software, for example, firmware.

Although the present disclosure is described with reference to embodiments, in a process of implementing the present disclosure that claims protection, a person skilled in the art may understand and implement another variation of the disclosed embodiments by viewing the accompanying drawings, the disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this disclosure are described above. The foregoing descriptions are examples, are not exhaustive, and are not limited to the disclosed embodiments. Many modifications and changes are clear to a person of ordinary skill in the art without departing from the scope of the described embodiments. The selection of terms used in this specification is intended to best explain the principles of embodiments, practical application, or improvements to technologies in the market, or to enable another person of ordinary skill in the art to understand embodiments disclosed in this specification.

What is claimed is:

1. A method comprising:
   creating a service instance in a network domain;
   determining a first mapping relationship between the network domain and one or more communication connectors on at least one node; and
   determining, based on first information about the first mapping relationship and second information about a second mapping relationship between a port prototype of a software component and the service instance, a third mapping relationship between the service instance and a target communication connector on the at least one node,
   wherein the port prototype comprises a receive port prototype configured to request a service or data on the software component or comprises a send port prototype configured to provide the service or the data to the service instance.

2. The method of claim 1, wherein creating the service instance comprises:
   determining an identifier (ID) of the network domain; and
   determining that the service instance is associated with the ID when a communication protocol of the service instance is a data distribution service (DDS).

3. The method of claim 1, wherein each of the one or more communication connectors is associated with an Internet Protocol (IP) address.

4. The method of claim 1, wherein determining the third mapping relationship comprises:
   determining, based on the first information, a first communication connector information set corresponding to the network domain, wherein the first communication connector information set comprises at least one first communication connector on the at least one node;
   determining, based on the second information, a second communication connector information set corresponding to the port prototype, wherein the second communication connector information set comprises at least one second communication connector on a target node; and
   determining, based on the first communication connector information set and the second communication connector information set, the third mapping relationship.

5. The method of claim 4, wherein determining the second communication connector information set comprises:
   obtaining, based on the second mapping relationship, an association relationship among the service instance, an executable program, and a process;
   determining, based on the association relationship, an associated node associated with the service instance; and
   determining, based on at least one third communication connector on the associated node, the second communication connector information set.

6. The method of claim 4, wherein before determining the third mapping relationship, the method further comprises determining, based on an intersection set of the first communication connector information set and the second communication connector information set, the target communication connector.

7. The method of claim 1, further comprising configuring a communication service in an AUTomotive Open System ARchitecture (AUTOSAR) adaptive platform.

8. An apparatus comprising:
   a memory configured to store programming instructions; and
   at least one processor coupled to the memory and configured to execute the programming instructions to cause the apparatus to:
   create a service instance in a network domain;
   determine a first mapping relationship between the network domain and one or more communication connectors on at least one node; and
   determine, based on first information about the first mapping relationship and second information about a second mapping relationship between a port prototype of a software component and the service instance, a third mapping relationship between the service instance and a target communication connector on the at least one node,
   wherein the port prototype comprises a receive port prototype configured to request a service or data on the software component or comprises a send port prototype configured to provide the service or the data to the service instance.

9. The apparatus of claim 8, wherein the at least one processor is further configured to execute the programming instructions to cause the apparatus to:
determine an identifier (ID) of the network domain; and
determine that the service instance is associated with the ID when a communication protocol of the service instance is a data distribution service (DDS).

10. The apparatus of claim 8, wherein each of the one or more communication connectors is associated with an Internet Protocol (IP) address.

11. The apparatus of claim 8, wherein the at least one processor is further configured to execute the programming instructions to cause the apparatus to:
determine, based on the first information, a first communication connector information set corresponding to the network domain, wherein the first communication connector information set comprises at least one first communication connector on the at least one node;
determine, based on the second information, a second communication connector information set corresponding to the port prototype, wherein the second communication connector information set comprises at least one second communication connector on a target node; and
determine, based on the first communication connector information set and the second communication connector information set, the third mapping relationship.

12. The apparatus of claim 11, wherein the at least one processor is further configured to execute the programming instructions to cause the apparatus to:
obtain, based on the second mapping relationship, an association relationship among the service instance, an executable program, and a process;
determine, based on the association relationship, an associated node associated with the service instance; and
determine, based on at least one third communication connector on the associated node, the second communication connector information set.

13. The apparatus of claim 11, wherein before determining the third mapping relationship, the at least one processor is further configured to execute the programming instructions to cause the apparatus to determine, based on an intersection set of the first communication connector information set and the second communication connector information set, the target communication connector.

14. The apparatus of claim 8, wherein the apparatus is in an AUTomotive Open System ARchitecture (AUTOSAR) adaptive platform.

15. A computer program product comprising computer-executable instructions that are stored on a non-transitory computer-readable medium and that, when executed by at least one processor, cause an electronic device to:
create a service instance in a network domain;
determine a first mapping relationship between the network domain and one or more communication connectors on at least one node; and
determine, based on first information about the first mapping relationship and second information about a second mapping relationship between a port prototype of a software component and the service instance, a third mapping relationship between the service instance and a target communication connector on the at least one node,
wherein the port prototype comprises a receive port prototype configured to request a service or data on the software component or comprises a send port prototype configured to provide the service or the data to the service instance.

16. The computer program product of claim 15, wherein when executed by the at least one processor, the computer-executable instructions further cause the electronic device to:
determine an identifier (ID) of the network domain; and
determine that the service instance is associated with the ID when a communication protocol of the service instance is a data distribution service (DDS).

17. The computer program product of claim 15, wherein each of the one or more communication connectors is associated with an Internet Protocol (IP) address, and wherein when executed by the at least one processor, the computer-executable instructions further cause the electronic device to configure a communication service in an AUTomotive Open System ARchitecture (AUTOSAR) adaptive platform.

18. The computer program product of claim 15, wherein when executed by the at least one processor, the computer-executable instructions further cause the electronic device to:
determine, based on the first information, a first communication connector information set corresponding to the network domain, wherein the first communication connector information set comprises at least one first communication connector on the at least one node;
determine, based on the second information, a second communication connector information set corresponding to the port prototype, wherein the second communication connector information set comprises at least one second communication connector on a target node; and
determine, based on the first communication connector information set and the second communication connector information set, the third mapping relationship.

19. The computer program product of claim 18, wherein when executed by the at least one processor, the computer-executable instructions further cause the electronic device to:
obtain, based on the second mapping relationship, an association relationship among the service instance, an executable program, and a process;
determine, based on the association relationship, an associated node associated with the service instance; and
determine, based on at least one third communication connector on the associated node, the second communication connector information set.

20. The computer program product of claim 18, wherein before determining the third mapping relationship and when executed by the at least one processor, the computer-executable instructions further cause the electronic device to determine, based on an intersection set of the first communication connector information set and the second communication connector information set, the target communication connector.

* * * * *